United States Patent Office 2,882,730
Patented Apr. 21, 1959

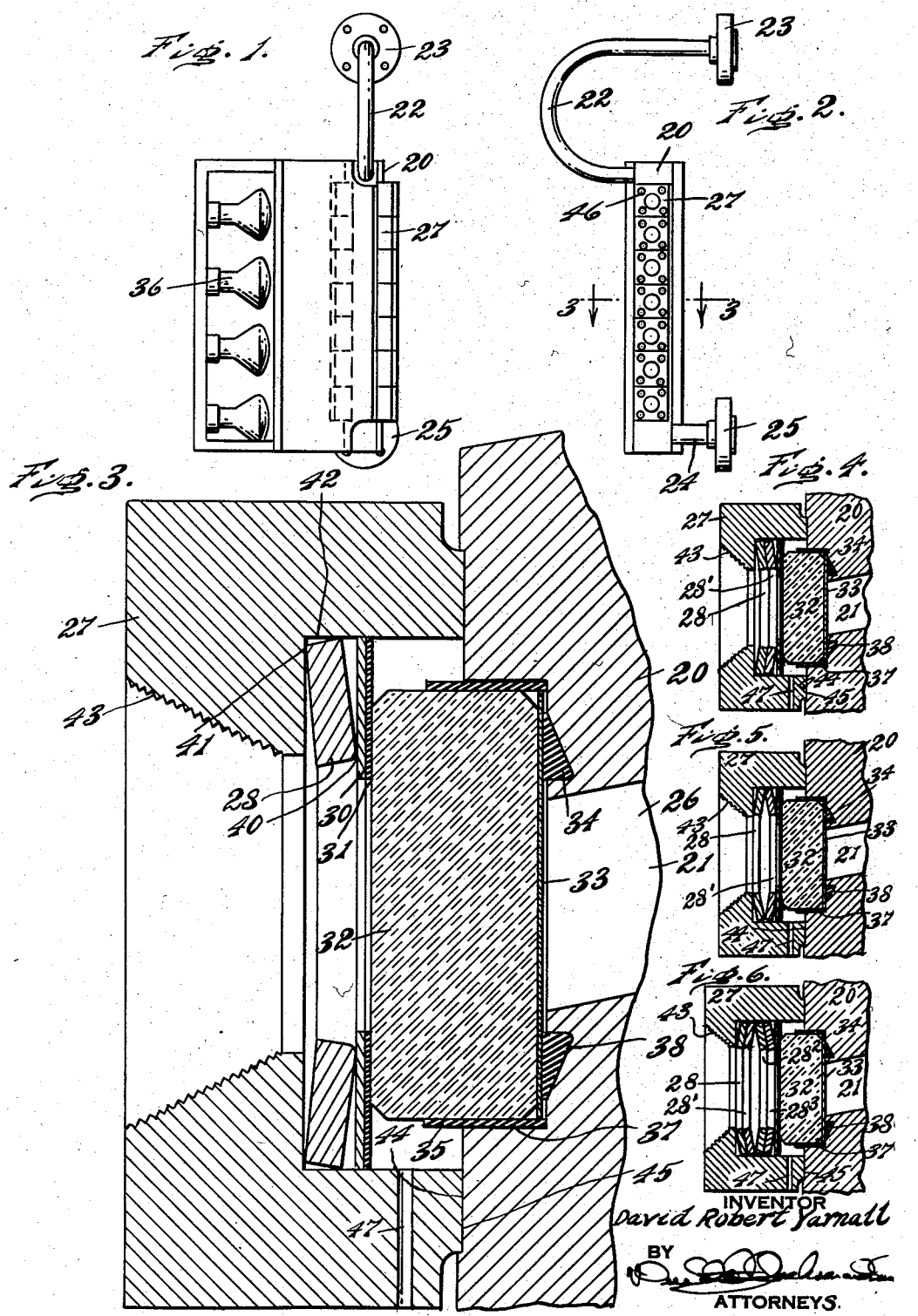

2,882,730

LIQUID LEVEL GAUGE

David Robert Yarnall, Philadelphia, Pa., assignor to Yarnall-Waring Company, Philadelphia, Pa., a corporation of Pennsylvania Application February 20, 1956, Serial No. 566,434

9 Claims. (Cl. 73—331)

The present invention relates to a liquid level gauge particularly of the type which is suited for use in steam boilers.

A purpose of the invention is to provide a gauge window which will stand up under changes in temperature and relatively high pressures in service.

A further purpose is to avoid the tendency to spall the outside of a gauge window by pressure concentration.

A further purpose is to secure a gauge cover to the body under a preload which is greater than the load developed between the cover and the window and to interpose a Bellville spring between the cover and the window, deflecting the Bellville spring to maintain resilient seating pressure on the window.

A further purpose is to apply the load to the window by the inner engaging rim of the Bellville spring desirably acting through a pressure distributing washer and desirably also in line with the window gasket, preferably near the center of the gasket.

A further purpose is to bring the center of load application to a circular gauge window relatively inboard so as to reduce the diameter of the window which must bear the full load and reduce the tendency to spall off or shear outside portions of the window.

A further purpose is to employ a plurality of Bellville springs, either in parallel, in series, or in series-parallel.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 1 is a partially diagrammatic front elevation of a gauge according to the invention.

Figure 2 is a side elevation of the gauge of Figure 1.

Figure 3 is an enlarged section which conveniently may be on the line 3—3 of Figure 2 illlustrating the structure for mounting and sealing the gauge window.

Figures 4, 5 and 6 are reduced single sections similar to Figure 3 showing variations.

Describing in illustration but not in limitation and referring to the drawings:

In my United States Patent 2,330,102 granted September 21, 1943, for Liquid Level Gauge, I illustrate the resilient loading of the cover so as to apply load to the transparent window of the gauge. A further development of this is illustrated in my United States Patent 2,374,403, granted April 24, 1945, for Resilient Protection for Flat Gauge Glasses.

As the pressure on steam boilers and other pressure vessels is increased, difficulty has been encountered through the tendency of transparent glass windows to fail or shatter by spalling or shearing adjacent the edge.

I have discovered that by reconstructing the mounting of the gauge glass, the window resistance against spalling or shearing can be greatly increased, and the service life especially on gauges for high pressure steam boilers can correspondingly be increased.

In accordance with the invention a circular gauge window is employed, and the load is applied inboard with respect to the edge by means of a Bellville spring interposed between the cover and the window, preferably distributing the load over the window by a suitable washer.

I have further discovered that by lining up the Bellville spring load applying area with the cushion gasket between the window and the gauge bottom, a direct column support is obtained, reducing the likelihood of failure in shearing.

The cover in accordance with the invention is not only fully seated but desirably also preloaded against the gauge body under a load which is greater than that which will be applied by the Bellville spring in holding the gauge window in place. Accordingly under service conditions the cover and the body of the gauge function as if they were a single piece, while the Bellville spring resiliently urges the gauge window against the gasket.

A further feature of the invention is the greater stability by sealing pressure on the glass with respect to dimensional change of the cover assembly through use of a plurality of Bellville springs in series, the establishment of increased loading with maintenance of the same compressive range as for a single Bellville spring with placement of Bellville springs in parallel, or obtaining both effects by a series parallel arrangement.

Considering now the drawings in detail, I illustrate a gauge body 20 having a hollow interior 21 which extends from top to bottom of the gauge and has closures at the top and bottom except for connection to a steam pipe 22 connected to an upper point of the boiler by flange 23 and a water pipe 24 connected to a lower point of the boiler by flange 25.

In the form shown the body has a plurality of transverse indicating openings 26, each of which is equipped with a complete gauge assembly comprising a cover 27, a Bellville spring 28, a load distributing washer 30, a cushion washer 31, a window consisting of a transparent glass 32 and a transparent mica sheet 33 on the inside, a cushion gasket 34 and a cushion collar 35. An assembly of this character is applied on each end of each of openings 26 so that a suitable illuminator 36 can project light through one window, across the interior of the gauge and out of the other window as well known. The detail of the illuminator forms no part of the present invention.

In the form of the invention shown the gauge glass 32 and the mica sheet 33 are circular in the vertical plane transverse to the paper, and occupy a gauge body socket or recess 37 and seat against the cushion gasket 34 which is in a suitable wedge-shape gasket recess 38 which is desirably of the character illustrated in Walter J. Kinderman United States Patent 2,201,542 granted May 21, 1940, for Gauge Glass with Gasket and Gasket Seat. The seat and the gasket are suitably narrower or deeper at the inside than at the outside, and form a ring of wedge cross section as shown. Any other suitable internal sealing gasket may be used as desired.

The cushion collar 35 tends to reduce the likelihood of mechanical stress concentration laterally of the wall of the gasket 37 against the gauge window and has suitably a cylindrical collar surrounding the window.

The cushion washer 31 is suitably a resilient nonmetallic washer, of asbestos or the like, which reduces the likelihood of stress concentration by the annular metallic washer 30 engaged with the Bellville spring.

The Bellville spring is of any suitable metal which will maintain spring properties at the operating temperature, suitably stainless steel, desirably dished as shown, and it has an inboard load transmitting edge 40 which engages the washer 30 at a position which is desirably about in line with the radial mid-position of the cushion gasket 34 so that the load is applied in the manner of a column on the gauge window. The Bellville spring also has an outboard load applying rim 41 which engages in a socket 42 in the inside of the cover 27 and transmits load from the cover. The cover has a central opening 43 which forms a window substantially in line with the indicating opening 26.

The cover has a suitably flat inner end 44 which engages in a suitably flat seat 45 in the gauge body. The bolts or other suitable fastening means 46 are continued so as to not only place the cover against the gauge body but also build up in the bolts a sufficient prestress so that the initially more pronouncedly dished Bellville spring has flattened out sufficiently to maintain a resilient load on the pressure applying washer 30, the cushion washer 31, the gauge glass 32 and the optional mica sheet 33 against the cushion gasket.

It is very desirable to provide a vent opening 47 through the side of the cover to prevent pressure buildup between the cover and the body in the event of slight leakage through the sealing gasket with resulting tendency to form a white coating on the glass. This also serves as a simple means of detecting leakage at a convenient observation point corresponding to the location of the vent hole 47.

It will be evident that one of the very desirable features of the invention is that the load is applied by the Bellville spring relatively inboard with respect to the outer edge of the circular gauge window, and preferably in line with an intermediate point such as the middle of the cushion gasket 34. At the same time whether the internal pressure on the gauge is high or low, and whether the boiler is operating or shut down, there is a resilient load applied by the Bellville spring which is great enough to hold the gauge window seated against the cushion gasket under all conditions.

Accordingly there is very effective and desirable load distribution which minimizes the danger of failure of the glass by spalling or shearing.

While in many cases a single Bellville spring will serve, there are special advantages in using multiple Bellville springs and applying pressure to an individual gauge glass. Considering the form of Figure 4, a plurality of Bellville springs 28 and 28', in this case 2, are placed in symmetrical contact (parallel relation) as shown to apply pressure between the cover and the gauge glass after the manner of the form of Figures 1 to 3. This provides increased loading with maintenance of the same compression range as for a single Bellville spring. This form provides for higher pressure containment for the same tolerance range of the parts which would constitute the window assembly.

In some instances, as shown in Figure 5, it is preferable to arrange the Bellville springs in reverse relation (series). This provides greater stability of sealing pressure on the glass with respect to dimensional change of the cover assembly.

In some cases both forms are used together in series parallel arrangement, as shown in Figure 6. Here Bellville springs 28 and 28' form a parallel pair which are in series relation with Bellville spring $28^2$ and $28^3$. This provides higher sealing pressure as well as greater stability of sealing pressure with respect to dimensional change of the assembly.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a liquid level gauge, a gauge body having an interior opening and having a gauge inspection opening which is visible from the outside, a transparent window of generally circular contour covering the gauge inspection opening on the outside of the gauge body, a gasket interposed between the gauge body and the window and surrounding the gauge inspection opening, a gauge cover on the outside of the window having a window opening which is in line with the gauge inspection opening, Bellville spring means interposed between the cover and the window and applying pressure to the window, and means for securing the gauge cover to the body and sustaining a stress in said Bellville spring means in favor of maintaining said window seated against said gasket in opposition to the maximum deforming force applied from inside said gauge to the Bellville spring means in service.

2. A gauge of claim 1, in which the Bellville spring means has an inner engaging rim and an outer engaging rim, the inner engaging rim acting against the window and the outer engaging rim acting against the cover.

3. A gauge of claim 2, in combination with a pressure distributing washer interposed between the inner engaging rim of the Bellville spring and the transparent window.

4. A gauge of claim 3, in which the inner engaging rim of the Bellville spring is in line with the gasket.

5. A gauge of claim 1, in which the Bellville spring means includes a plurality of Bellville springs interposed between the cover and the window and applying pressure to the window.

6. A gauge of claim 5, in which said Bellville springs are placed in series.

7. A gauge of claim 5, in which said Bellville springs are placed in parallel.

8. A gauge of claim 5, in which said Bellville springs are placed in series and in parallel.

9. A liquid level gauge comprising a gauge body having a level indicating opening, a transparent window of generally circular contour covering the indicating opening on the outside of the body, a gasket interposed between and sealing the space between the body and the window, a cover on the outside of the body and the window engaging primarily against the body and having a window opening in line with the window, Bellville spring means having an outer engaging rim and an inner engaging rim interposed between the cover and the window and having the outer engaging rim of the Bellville spring means against the cover, a metallic pressure distributing washer interposed between the Bellville spring means and the window and engaged by the inner engaging rim of the Bellville spring means, the inner engaging rim of the Bellville spring being in line with the gasket, and means for securing the gauge cover to the body and sustaining a stress in said Bellville spring means in favor of maintaining said window seated against said gasket in opposition to the maximum deforming force applied from inside said gauge to the Bellville spring means in service.

References Cited in the file of this patent

UNITED STATES PATENTS

| | | |
|---|---|---|
| 2,357,753 | Matuszak | Sept. 5, 1944 |
| 2,379,053 | Weingart | June 26, 1945 |
| 2,757,632 | Wittlin | Aug. 7, 1956 |

FOREIGN PATENTS

| | | |
|---|---|---|
| 923,093 | Germany | Feb. 3, 1955 |